US008095503B2

(12) United States Patent
Holland et al.

(10) Patent No.: US 8,095,503 B2
(45) Date of Patent: Jan. 10, 2012

(54) ALLOWING CLIENT SYSTEMS TO INTERPRET HIGHER-REVISION DATA STRUCTURES IN STORAGE SYSTEMS

(75) Inventors: Mark C. Holland, Pittsburgh, PA (US); Denis M. Serenyi, Palo Alto, CA (US)

(73) Assignee: Panasas, Inc., Sunnyvale, CA (US)

(*) Notice: Subject to any disclaimer, the term of this patent is extended or adjusted under 35 U.S.C. 154(b) by 2972 days.

(21) Appl. No.: 10/372,346

(22) Filed: Feb. 21, 2003

(65) Prior Publication Data

US 2004/0003055 A1 Jan. 1, 2004

Related U.S. Application Data

(60) Provisional application No. 60/368,785, filed on Mar. 29, 2002, provisional application No. 60/372,042, filed on Apr. 12, 2002.

(51) Int. Cl.
*G06F 17/30* (2006.01)

(52) U.S. Cl. ........ 707/620; 707/610; 707/611; 707/613; 707/617; 707/618; 707/624; 707/626; 707/634; 707/635; 707/636; 707/637; 707/638; 707/661; 707/674; 709/213; 709/220; 709/248

(58) Field of Classification Search .................. 709/229; 711/206
See application file for complete search history.

(56) References Cited

U.S. PATENT DOCUMENTS 5,355,453 A * 10/1994 Row et al. .................... 709/219
5,630,007 A * 5/1997 Kobayashi et al. ........... 386/113
5,655,152 A * 8/1997 Ohnishi et al. .................. 710/36
5,668,970 A * 9/1997 Cowart et al. ................. 711/206
5,787,251 A * 7/1998 Hamilton et al. ............. 709/203
5,920,725 A * 7/1999 Ma et al. ........................ 717/171
5,944,783 A * 8/1999 Nieten .......................... 709/202
5,973,731 A * 10/1999 Schwab ........................ 348/161
6,014,696 A * 1/2000 Araki et al. ................... 709/219
6,584,520 B1 * 6/2003 Cowart et al. ................... 710/68
6,931,450 B2 * 8/2005 Howard et al. ............... 709/229
2002/0078239 A1 * 6/2002 Howard et al. ............... 709/245
2003/0065866 A1 * 4/2003 Spencer ........................ 710/306

* cited by examiner

*Primary Examiner* — Syling Yen

(74) *Attorney, Agent, or Firm* — Morgan, Lewis & Bockius LLP

(57) ABSTRACT

A method for allowing client computers in a distributed object-based data storage system to interpret higher revision data structures. In one embodiment, clients request layout maps of objects to be accessed from respective storage managers in the system and then construct and execute directed acyclic graphs (DAG) to accomplish desired I/O operations for data access. When a client computer running an older software revision is not able to interpret a particular data organization supplied by the storage manager that was designed after that client's software was installed, the client sends to the storage manager a description of the desired data access operation. The storage manager, in turn, interprets a data layout scheme for a client on a per-access basis and returns to that client a DAG containing a data structure that describes the sequence of I/O operations necessary to effect the data access. The client can then execute the storage manager-supplied DAG to carry out the data access.

5 Claims, 2 Drawing Sheets

FM
SAM
SM
SAM
RM
10
14
16
18
NETWORK 28
24
26
12
22
SAM
Windows Client
SAM
Linux Client
OBD
PM

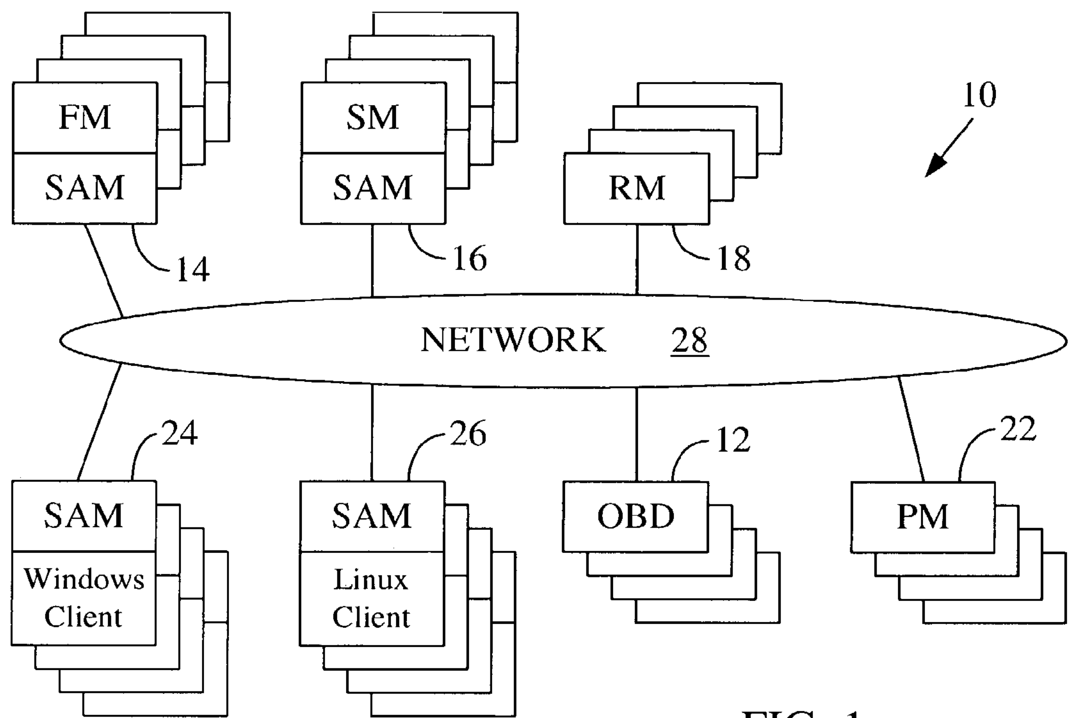
FIG. 1
FIG. 2
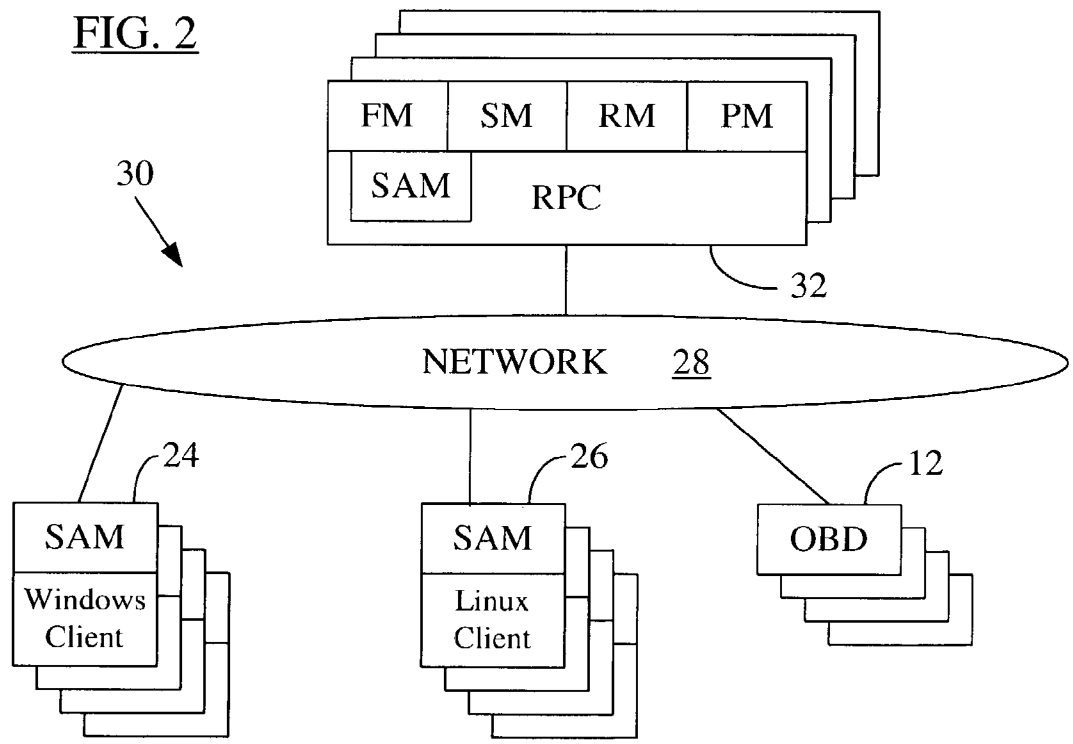

ALLOWING CLIENT SYSTEMS TO INTERPRET HIGHER-REVISION DATA STRUCTURES IN STORAGE SYSTEMS

REFERENCE TO RELATED APPLICATIONS

This application claims priority benefits of prior filed co-pending and commonly-owned U.S. provisional patent applications Ser. No. 60/368,785, filed on Mar. 29, 2002 and Ser. No. 60/372,042, filed on Apr. 12, 2002, the disclosures of both of which are incorporated herein by reference in their entireties.

BACKGROUND

1. Field of the Invention

The present invention generally relates to data storage systems and methods, and, more particularly, to a method for allowing client computers in a distributed object-based data storage system to interpret higher revision data structures.

2. Description of Related Art

In a distributed data storage system, servers and client computers may interact with each other and with data storage disks or other system agents in a pre-defined manner. For example, client computers may read from or write into the storage disks various types of data including, for example, normal application-specific data or redundant information being stored for fault tolerance. Generally speaking, the client computers execute various application and operating software resident thereon to accomplish the desired data processing tasks. The software resident in a client computer's memory may have been designed at a particular time in the past. Therefore, as more advanced or newer versions of the client and server software become available, there appears a point in time when a client computer running an older software revision may not be able to interpret a particular data organization that was shipped (e.g., as part of a newer server software configuration) after that client's software was installed. Thus, it is desirable to devise a mechanism that allows an old client (i.e., a client running an older version of software) to access data and information stored in a newer format in the storage system. Such a mechanism allows an older client to effectively operate in a newer server or system environment, thereby reducing the need to spend time, money, and effort to replace or upgrade older client machines every time a new or upgraded server or storage configuration is installed as part of the data storage network in an organization.

SUMMARY

In one embodiment, the present invention contemplates a method of accessing data in an object-based data storage system including a first computer and a second computer. The method includes: the first computer obtaining a data access map from the second computer, wherein the data access map contains information to be interpreted by the first computer to perform the data access; the first computer interpreting the data access map so as to determine a first set of operations needed to be performed by the first computer for accessing the data; and the first computer performing the first set of operations and a second set of operations to access the data.

In an object-based data storage system including a plurality of client computers and a server computer, wherein each of the plurality of client computers is configured to perform a corresponding data access to a storage disk in the data storage system, the present invention further contemplates a method of accessing data in the storage disk. The method comprises: each of the plurality of client computers constructing a corresponding directed acyclic graph (DAG), wherein each the corresponding DAG identifies a sequence for a respective first set of operations needed to be performed by corresponding client computer for the corresponding data access; and each of the plurality of client computers executing the corresponding DAG to perform the respective first set of operations in the sequence for the corresponding data access.

In a still further embodiment, the present invention contemplates a method of accessing data in an object-based data storage system. The method comprises: receiving a request from a requester describing a data access operation needed to be performed by the requester to access the data in the data storage system; constructing a directed acyclic graph (DAG) in response to the request using information contained in a data access map corresponding to the data access to be performed by the requester, wherein the DAG identifies a sequence of I/O operations for the data access operation needed to be performed by the requestor to access the data; sending the DAG to the requester; and configuring the requestor to execute the DAG to perform the I/O operations in the sequence so as to access the data.

According to present invention, in a method for allowing client computers in a distributed object-based data storage system to interpret higher revision data structures, when a client computer running an older software revision is not able to interpret a particular data organization supplied by the storage manager that was designed after that client's software was installed, the client sends to the storage manager a description of the desired data access operation (e.g., a data read operation, a data write operation, etc.). The storage manager, in turn, interprets a data layout scheme for the client on a per-access basis and returns to that client a DAG containing a data structure that describes the sequence of I/O operations necessary to effect the data access. The client can then execute the storage manager-supplied DAG to carry out the data access. Such a mechanism allows an older client to effectively operate in a newer server or system environment, without the need to upgrade or replace the older client machine.

BRIEF DESCRIPTION OF THE DRAWINGS

The accompanying drawings, which are included to provide a further understanding of the invention and are incorporated in and constitute a part of this specification, illustrate embodiments of the invention that together with the description serve to explain the principles of the invention. In the drawings:

FIG. 1 illustrates an exemplary network-based file storage system designed around Object Based Secure Disks (OBSDs or OBDs);

FIG. 2 illustrates an implementation where various managers shown individually in FIG. 1 are combined in a single binary file.

DETAILED DESCRIPTION

Figure 3:
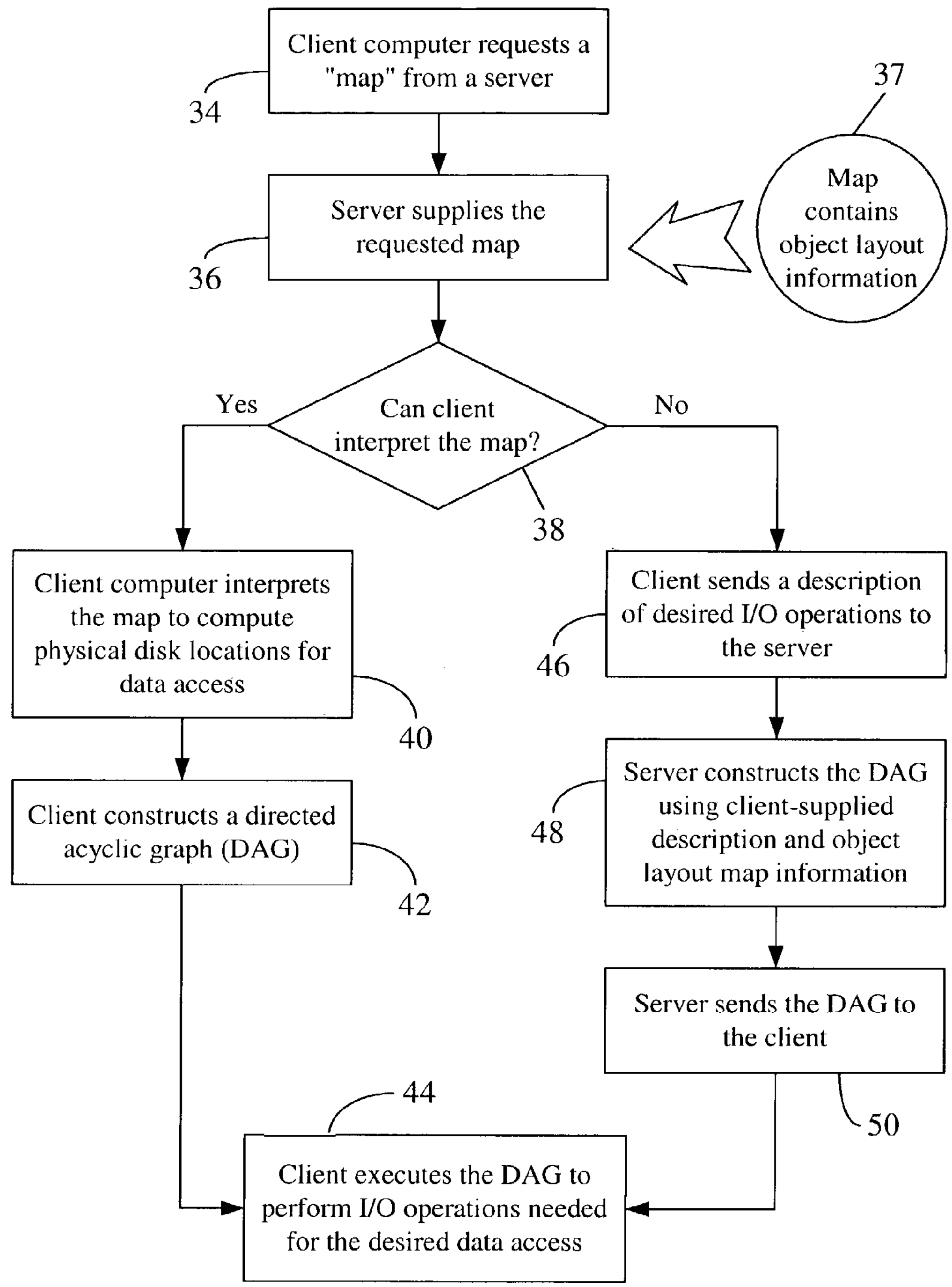
FIG. 3 shows an exemplary flowchart depicting how a client in the distributed object-based data storage systems in FIGS. 1 and 2 interprets newer data structures according to one embodiment of the present invention.

Reference will now be made in detail to the preferred embodiments of the present invention, examples of which are illustrated in the accompanying drawings. It is to be understood that the figures and descriptions of the present invention included herein illustrate and describe elements that are of particular relevance to the present invention, while eliminating, for purposes of clarity, other elements found in typical data storage systems or networks.

It is worthy to note that any reference in the specification to "one embodiment" or "an embodiment" means that a particular feature, structure or characteristic described in connection with the embodiment is included in at least one embodiment of the invention. The appearances of the phrase "in one embodiment" at various places in the specification do not necessarily all refer to the same embodiment.

FIG. 1 illustrates an exemplary network-based file storage system 10 designed around Object Based Secure Disks (OBSDs or OBDs) 12. The file storage system 10 is implemented via a combination of hardware and software units and generally consists of managers 14, 16, 18, and 22, OBDs 12, and clients 24, 26. It is noted that FIG. 1 illustrates multiple clients, OBDs, and managers—i.e., the network entities—operating in the network environment. However, for the ease of discussion, a single reference numeral is used to refer to such entity either individually or collectively depending on the context of reference. For example, the reference numeral "12" is used to refer to just one OBD or a group of OBDs depending on the context of discussion. Similarly, the reference numerals 14-22 for various managers are used interchangeably to also refer to respective servers for those managers. For example, the reference numeral "14" is used to interchangeably refer to the software file managers (FM) and also to their respective servers depending on the context. It is noted that each manager is an application program code or software running on a corresponding server. The server functionality may be implemented with a combination of hardware and operating software. For example, each server in FIG. 1 may be a Windows NT® server. Thus, the file system 10 in FIG. 1 is an object-based distributed data storage system implemented in a client-server configuration.

The network 28 may be a LAN (Local Area Network), WAN (Wide Area Network), MAN (Metropolitan Area Network), SAN (Storage Area Network), wireless LAN, or any other suitable data communication network including a TCP/IP (Transmission Control Protocol/Internet Protocol) based network (e.g., the Internet). A client 24, 26 may be any computer (e.g., a personal computer or a workstation) electrically attached to the network 28 and running appropriate operating system software as well as client application software designed for the system 10. FIG. 1 illustrates a group of clients or client computers 24 running on Microsoft Windows® operating system, whereas another group of clients 26 are running on the Linux® operating system. The clients 24, 26 thus present an operating system-integrated file system interface. The semantics of the host operating system (e.g., Windows®, Linux®, etc.) may preferably be maintained by the file system clients. The clients may run various applications including, for example, routine database applications (e.g., an Oracle®-based application), complicated scientific data processing applications, word processors (e.g., a Microsoft® Word application), etc.

The manager (or server) and client portions of the program code may be written in C, $C^{++}$, or in any other compiled or interpreted language suitably selected. The client and manager software modules may be designed using standard software tools including, for example, compilers, linkers, assemblers, loaders, bug tracking systems, memory debugging systems, etc.

In one embodiment, the manager software and program codes running on the clients may be designed without knowledge of a specific network topology. In that case, the software routines may be executed in any given network environment, imparting software portability and flexibility in storage system designs. However, it is noted that a given network topology may be considered to optimize the performance of the software applications running on it. This may be achieved without necessarily designing the software exclusively tailored to a particular network configuration.

FIG. 1 shows a number of OBDs 12 attached to the network 28. An OBSD or OBD 12 is a physical disk drive that stores data files in the network-based system 10 and may have the following properties: (1) it presents an object-oriented interface rather than a sector-based interface (wherein each "block" on a disk contains a number of data "sectors") as is available with traditional magnetic or optical data storage disks (e.g., a typical computer hard drive); (2) it attaches to a network (e.g., the network 28) rather than to a data bus or a backplane (i.e., the OBDs 12 may be considered as first-class network citizens); and (3) it enforces a security model to prevent unauthorized access to data stored thereon.

The fundamental abstraction exported by an OBD 12 is that of an "object," which may be defined as a variably-sized ordered collection of bits. Contrary to the prior art block-based storage disks, OBDs do not export a sector interface (which guides the storage disk head to read or write a particular sector on the disk) at all during normal operation. Objects on an OBD can be created, removed, written, read, appended to, etc. OBDs do not make any information about particular disk geometry visible, and implement all layout optimizations internally, utilizing lower-level information than can be provided through an OBD's direct interface with the network 28. In one embodiment, each data file and each file directory in the file system 10 are stored using one or more OBD objects.

In a traditional networked storage system, a data storage device, such as a hard disk, is associated with a particular server or a particular server having a particular backup server. Thus, access to the data storage device is available only through the server associated with that data storage device. A client processor desiring access to the data storage device would, therefore, access the associated server through the network and the server would access the data storage device as requested by the client.

On the other hand, in the system 10 illustrated in FIG. 1, each OBD 12 communicates directly with clients 24, 26 on the network 28, possibly through routers and/or bridges (not shown). The OBDs, clients, managers, etc., may be considered as "nodes" on the network 28. In system 10, no assumption needs to be made about the network topology (as noted hereinbefore) except that each node should be able to contact every other node in the system. The servers (e.g., servers 14, 16, 18, etc.) in the network 28 merely enable and facilitate data transfers between clients and OBDs, but the servers do not normally implement such transfers.

In one embodiment, the OBDs 12 themselves support a security model that allows for privacy (i.e., assurance that data cannot be eavesdropped while in flight between a client and an OBD), authenticity (i.e., assurance of the identity of the sender of a command), and integrity (i.e., assurance that in-flight data cannot be tampered with). The authenticity determination may be capability-based, whereas the privacy and integrity portions of the security model may be implemented using network-level encryption and/or digital signing. A manager grants a client the right to access the data storage (in one or more OBDs) by issuing to it a "capability." Thus, a capability is a token that can be granted to a client by a manager and then presented to an OBD to authorize service. Clients may not create their own capabilities (this can be assured by using known cryptographic techniques), but rather receive them from managers and pass them along to the OBDs.

A capability is simply a description of allowed operations. A capability may be a set of bits (1's and 0's) placed in a predetermined order. The bit configuration for a capability may specify the operations for which that capability is valid. Thus, there may be a "read capability," a "write capability," a "set-attribute capability," etc. Every command sent to an OBD may need to be accompanied by a valid capability of the appropriate type. A manager may produce a capability and then digitally sign it using a cryptographic key that is known to both the manager and the appropriate OBD, but unknown to the client. The client will submit the capability with its command to the OBD, which can then verify the signature using its copy of the key, and thereby confirm that the capability came from an authorized manager (one who knows the key) and that it has not been tampered with in flight. An OBD may itself use cryptographic techniques to confirm the validity of a capability and reject all commands that fail security checks. Thus, capabilities may be cryptographically "sealed" using "keys" known only to one or more of the managers 14-22 and the OBDs 12.

Logically speaking, various system "agents" (i.e., the clients 24, 26, the managers 14-22, and the OBDs 12) are independently-operating network entities. Day-to-day services related to individual files and directories are provided by file managers (FM) 14. The file manager 14 is responsible for all file- and directory-specific states. The file manager 14 creates, deletes and sets attributes on entities (i.e., files or directories) on clients' behalf. When clients want to access other entities on the network 28, the file manager performs the semantic portion of the security work—i.e., authenticating the requester and authorizing the access—and issuing capabilities to the clients. File managers 14 may be configured singly (i.e., having a single point of failure) or in failover configurations (e.g., machine B tracking machine A's state and if machine A fails, then taking over the administration of machine A's responsibilities until machine A is restored to service).

The primary responsibility of a storage manager (SM) 16 is the aggregation of OBDs for performance and fault tolerance. A system administrator (e.g., a human operator or software) may choose any layout or aggregation scheme for a particular object. The SM 16 may also serve capabilities allowing clients to perform their own I/O to aggregate objects (which allows a direct flow of data between an OBD and a client). The storage manager 16 may also determine exactly how each object will be laid out—i.e., on what OBD or OBDs that object will be stored, whether the object will be mirrored, striped, parity-protected, etc. This distinguishes a "virtual object" from a "physical object". One virtual object (e.g., a file or a directory object) may be spanned over, for example, three physical objects (i.e., OBDs).

The storage access module (SAM) is a program code module that may be compiled into the managers as well as the clients. The SAM generates and sequences the OBD-level operations necessary to implement system-level I/O (input/output) operations, for both simple and aggregate objects.

The installation of the manager and client software to interact with OBDs 12 and perform object-based data storage in the file system 10 may be called a "realm." The realm may vary in size, and the managers and client software may be designed to scale to the desired installation size (large or small). A realm manager 18 is responsible for all realm-global states. That is, all states that are global to a realm state are tracked by realm managers 18. A realm manager 18 maintains global parameters, notions of what other managers are operating or have failed, and provides support for up/down state transitions for other managers. A performance manager 22 may run on a server that is separate from the servers for other managers (as shown, for example, in FIG. 1) and may be responsible for monitoring the performance of the file system realm and for tuning the locations of objects in the system to improve performance. The program codes for managers typically communicate with one another via RPC (Remote Procedure Call) even if all the managers reside on the same node (as, for example, in the configuration in FIG. 2).

A further discussion of various managers shown in FIG. 1 (and FIG. 2) and their functionality is provided on pages 11-15 in the co-pending, commonly-owned U.S. patent application Ser. No. 10/109,998, filed on Mar. 29, 2002, titled "Data File Migration from a Mirrored RAID to a Non-Mirrored XOR-Based RAID Without Rewriting the Data", whose disclosure at pages 11-15 is incorporated by reference herein in its entirety.

FIG. 2 illustrates one implementation 30 where various managers shown individually in FIG. 1 are combined in a single binary file 32. FIG. 2 also shows the combined file available on a number of servers 32. In the embodiment shown in FIG. 2, various managers shown individually in FIG. 1 are replaced by a single manager software or executable file that can perform all the functions of each individual file manager, storage manager, etc. It is noted that all the discussion given hereinabove and later hereinbelow with reference to the file storage system 10 in FIG. 1 equally applies to the file storage system embodiment 30 illustrated in FIG. 2. Therefore, additional reference to the configuration in FIG. 2 is omitted throughout the discussion, unless necessary.

Every object stored on an OBD may have an associated set of attributes. Some of the major attributes for an object include: (1) a device_ID identifying, for example, the OBD storing that object and the file and storage managers managing that object; (2) an object-group_ID identifying the object group containing the object in question; and (3) an object_ID containing a number randomly generated (e.g., by a storage manager) to identify the object in question. For example, the values for the {device_ID, object-group_ID, object_ID} triplet for an object may be {SM #3, object-group #29, object #6003}. It is noted that, in one embodiment, each {device_ID, object-group_ID, object_ID} triplet must be unique in the realm. In other words, even if two objects have the same object_ID, they cannot have the same values for the corresponding {device_ID, object-group_ID, object_ID} triplets. It is noted that other object attributes may include a value identifying the time of creation of the object, and a pointer or flag indicating whether the object is a parent object (e.g., a sub-directory object) or a child object (e.g., a file object).

In one embodiment, the storage manager 16 creates and maintains a layout map for files and directories to be stored in the system 10. Every file or directory may have a unique layout map associated with it, and the layout map for a file/directory may reside on one or more OBDs 12. The layout map for a file/directory describes how that file/directory is arranged on the disks (i.e., OBDs 12). In one embodiment, the layout of an object may be selected on a file-by-file basis. A layout map may contain the following: (1) the file storage layout scheme (e.g., RAID-1, RAID-5, etc.) for files in a directory object; (2) the number and identities of disk(s) (OBDs) used to store the file or directory object; (3) the object identifiers used to identify each object (e.g., file/directory object) or a component object (if the object is an aggregate object) stored on each OBD; and (4) any other layout-specific information.

FIG. 3 shows an exemplary flowchart depicting how a client 24, 26 in the distributed object-based data storage systems in FIGS. 1 and 2 interprets newer data structures according to one embodiment of the present invention. Initially, at block 34, when a client computer 24, 26 (i.e., a software running on the client computer) wishes to access data (e.g., through a data read or write operation) in the system 10, the client first requests a "map" from its corresponding SM 16. In response to the client's request, the SM 16 supplies the requested map to the client (block 36). The map, as supplied by the SM 16, includes a layout map of the object containing the relevant data or portion of the data (block 37). Thus, as noted before, the server-supplied layout map describes the technique and the parameters that were used to place the data in a file or directory object onto one or more OBDs 12. For example, a layout map may describe that the data-containing object is stored in a RAID-5 layout, using 10 physical disks (i.e., OBDs 12). In other words, the layout map supplied by the SM 16 may describe only the static information about the layout of an object.

After the client receives the map from the storage manager, the client may first need to determine whether the client can interpret the map, i.e., whether the data structure or organization contained in the map is of a version or revision that is interpretable by the client as indicated at the decision block 38 in FIG. 3. If the client determines that it can interpret the map, the client uses the information in the map to compute physical disk locations that pertain to the particular data access (e.g., a data read operation, a data write operation, etc.) the client wishes to perform (block 40). For example, if the client wishes to write 100 bytes at a byte offset of 1024 into a file object, the client first uses the SM-supplied map to compute the disk or disks the client may need to contact for the desired write operation, and also to compute the object offsets on those disks that the client may need to update during the data write operation. In one embodiment, each client 24, 26 in the distributed object-based data storage system 10 (or 30) is configured to construct a directed acyclic graph (DAG) based on the information contained in the layout map received from the corresponding SM 16 (block 42). The DAG may uniquely identify the complete sequence of I/O operations (e.g., disk access, data transmission, confirmation of data delivery, etc.) to be performed by the client to accomplish the desired data access (e.g., a data read operation, a data write operation, etc.). The DAG may also identify the dependency constraints between two or more I/O operations in the sequence of I/O operations. After constructing the DAG, the client may execute the DAG using a generic DAG execution engine to carry out the I/O operations needed for the desired data access (block 44). The software for the DAG execution engine may be coded or designed in a network-specific manner to adapt to the particular network configuration or architecture.

At the decision block 38 in FIG. 3, it may, however, be possible that the client cannot interpret the map supplied by the SM as, for example, in a situation where the map was produced by a storage manager that is of a newer revision than that of the client. For example, the storage manager may employ newer mechanisms or data structures for arranging data (normal data and/or redundant data for fault tolerance) on OBDs. One solution to this problem may be to ask the storage manager to proxy the desired I/O operation(s), i.e., the client sends its data (e.g., in a data write operation) to the SM and then the SM performs the required I/O operation(s) on the client's behalf. This solution, however, may lead to excessive load on the SM and that can severely degrade the overall system performance. For example, in the proxy approach, during a data write operation, the data will need to transit the network twice—once from the client to the server, and then from the server to one or more OBDs—instead of only once had the client been able to directly write into the OBDs.

In one embodiment, another solution to the problem of client's inability to interpret higher-revision data structure or data organization is provided as depicted in FIG. 3. In that embodiment, as shown at block 46, when the client discovers that it cannot interpret the map supplied by the newer SM, the client 24, 26 sends to the SM 16 a description of the data access operation (e.g., a data read operation to object X, a data write operation to object Y, etc.) that the client wishes to perform on a given object (file/directory) to accomplish the desired data read/write operation. The client may simply execute an RPC against the storage manager 16. The client may send exactly the same information to the SM 16 as it would send if the SM were going to proxy the operation, except that here the client does not send or expect data with its request to the SM 16. The client may simply send to the SM 16 the information such as, for example, the object_ID, whether the access is a read or a write, the offset into the object at which to read or write, and the number of bytes to read or write. Although not relevant here, it is however noted that various other requests (e.g., get-attributes, set-attributes, etc.) related to access to the data storage may also be sent in this manner.

Using that object-specific layout information created and maintained therein along with the information about client-requested data access operation, the SM 16 constructs the necessary DAG (block 48) and then sends the DAG to the client (block 50). The DAG identifies the complete sequence of I/O operations (e.g., disk access, transmission of data, confirmation of data delivery, etc.) to be performed to effect the desired data access operation. The client can then interpret the SM-supplied DAG directly and execute that DAG to perform the required I/O operation(s) itself (block 44).

Thus, as a client 24, 26 can interpret a DAG and execute it using a generic execution engine—even when the client is of an older revision than that of the server (or SM 16)—it is almost always possible for the server to construct a DAG that is interpretable by the client. This SM-constructed DAG approach is preferably used when the SM is of a newer revision than that of the client as discussed herein. It is noted, however, that the SM-constructed DAG approach may still remain less efficient than the case where the client can itself interpret the DAG. But, the SM-constructed DAG approach may be far more efficient than the proxy solution discussed hereinabove because the data to be read or written does not need to transit the network twice (as is the case in the proxy solution) and because the load on the storage manager is kept low.

It is noted that various managers (e.g., file managers 14, storage managers 16, etc.) shown and described with reference to FIG. 1, and the program code implemented to operate the system 10 in FIG. 1 may reside on a computer-readable, tangible storage medium (e.g., a compact disc, an optical disc, a magnetic storage medium such as a computer hard drive, etc.) allowing ease of software portability and system management. The program code on the storage medium can be executed by a computer system processor and upon execution, the program code may cause the processor to perform various operations described hereinabove with reference to individual components (e.g., managers) constituting the program code. Similarly, a client application (e.g., any of the client applications 24, 26 in FIG. 1) can also be stored on a computer-readable data storage medium and executed therefrom.

The foregoing describes a method for allowing client computers in a distributed object-based data storage system to interpret higher revision data structures. In such a system, clients are directly responsible for reading and writing all data, both normal data and redundant information (for fault tolerance). In one embodiment, clients request layout maps of objects to be accessed from respective storage managers in the system and then construct and execute directed acyclic graphs (DAG) to accomplish desired I/O operations for data access. As time passes, newer mechanisms or solutions, for example, for arranging redundant information or store other data on the OBDs may be employed with newer revisions of storage manager software. Thus, a client computer running an older software revision may not be able to interpret a particular data organization that was designed after that client's software was installed. In order for allowing an old client to access data stored in a new format, a network service may be devised wherein a storage manager can interpret a data layout scheme for a client on a per-access basis and return to that client a DAG containing a data structure that describes the sequence of I/O operations necessary to effect a data access. The client can then execute the storage manager-supplied DAG to carry out the data access.

While the invention has been described in detail and with reference to specific embodiments thereof, it will be apparent to one skilled in the art that various changes and modifications can be made therein without departing from the spirit and scope thereof. Thus, it is intended that the present invention cover the modifications and variations of this invention provided they come within the scope of the appended claims and their equivalents.

The invention claimed is:

1. A method of accessing data in an object-based data storage system including a first computer and a second computer, said method comprising:

said first computer obtaining a data access map from said second computer, wherein said data access map contains information to be interpreted by said first computer to perform said data access;

said first computer interpreting said data access map so as to determine a first set of operations needed to be performed by said first computer for accessing said data; and said first computer performing said first set of operations and a second set of operations to access said data wherein said first computer performing said second set of operations includes:

said first computer constructing a directed acyclic graph (DAG) after interpreting said information in said data access map, wherein said DAG identifies a sequence for said second set of operations needed to be performed by said first computer for accessing said data; and said first computer executing said DAG to perform said second set of operations in said sequence.

2. The method of claim 1, wherein said data access map includes a layout map describing how one or more objects to be accessed during said data access are stored in said data storage system, and wherein said layout map contains at least one of the following:

a first information about a storage layout scheme for said one or more objects;

a second information about which one or more of a plurality of storage disks in said data storage system are used to store said one or more objects; and a third information about the number of disks from said plurality of storage disks that are used to store said one or more objects.

3. The method of claim 1, wherein said first computer performing said first set of operations includes at least one of the following:

said first computer computing, using said data access map, one or more physical disk locations in one or more of a plurality of storage disks in said data storage system that need to be accessed for said data access; and said first computer further computing one or more byte offsets for accessing said data in said one or more of said plurality of storage disks.

4. In an object-based data storage system including a plurality of client computers and a server computer, wherein each of said plurality of client computers is configured to perform a corresponding data access to a storage disk in said data storage system, a method of accessing data in said storage disk comprising:

each of said plurality of client computers constructing a corresponding directed acyclic graph (DAG), wherein each said corresponding DAG identifies a sequence for a respective first set of operations needed to be performed by corresponding client computer for said corresponding data access; and each of said plurality of client computers executing said corresponding DAG to perform said respective first set of operations in said sequence for said corresponding data access.

5. The method of claim 4, further comprising:

each of said plurality of client computers obtaining a respective data access map from said server computer, wherein each said respective data access map contains information to be interpreted by a corresponding client computer to determine a respective second set of operations needed to be performed by said client computer as part of said corresponding data access; and each of said plurality of client computers performing said respective second set of operations.

* * * * *